(12) United States Patent
Alme et al.

(10) Patent No.: US 10,482,247 B2
(45) Date of Patent: *Nov. 19, 2019

(54) MITIGATION OF MALWARE

(71) Applicant: McAfee, LLC, Santa Clara, CA (US)

(72) Inventors: Christoph Alme, Paderborn (DE);
Slawa Hahn, Paderborn (DE);
Sebastian Thoene, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,607

(22) Filed: Mar. 28, 2019

(65) Prior Publication Data

US 2019/0228152 A1     Jul. 25, 2019

Related U.S. Application Data

(63) Continuation of application No. 15/290,185, filed on Oct. 11, 2016, now Pat. No. 10,275,594, which is a continuation of application No. 14/318,406, filed on Jun. 27, 2014, now Pat. No. 9,465,939.

(51) Int. Cl.
*G06F 12/14* (2006.01)
*G06F 21/56* (2013.01)

(52) U.S. Cl.
CPC .......... *G06F 21/565* (2013.01); *G06F 21/562* (2013.01); *G06F 21/563* (2013.01); *G06F 21/564* (2013.01); *G06F 2221/033* (2013.01); *G06F 2221/034* (2013.01)

(58) Field of Classification Search
USPC ......................................................... 726/23
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 6,993,660 | B1 | 1/2006 | Libenzi et al. |
| 7,103,838 | B1 | 9/2006 | Krishnamurthy et al. |
| 7,506,155 | B1 | 3/2009 | Stewart et al. |
| 7,716,297 | B1 | 5/2010 | Wittel et al. |

(Continued)

FOREIGN PATENT DOCUMENTS

| | | |
|---|---|---|
| JP | 2014504399 A | 2/2014 |
| WO | 2015200845 A1 | 12/2015 |

OTHER PUBLICATIONS

EPO Oct. 26, 2018 Communication in European Application No. 15811662.4 dated Oct. 26, 2018; 6 pages.

(Continued)

*Primary Examiner* — Amare F Tabor
(74) *Attorney, Agent, or Firm* — Patent Capital Group

(57) ABSTRACT

Systems and methods are provided in example embodiments for mitigating malicious calls. The system can be configured to determine a series of checksums for a file, compare the series of checksums to a checksum tree, where the checksum tree includes a plurality of nodes that each include a fuzzy checksum of known malware, and assign one or more classifications to the file, where each of the one or more classifications is based on each node of the checksum tree that matches a checksum in the series of checksums and includes whether the file includes malware or benign checksums.

14 Claims, 12 Drawing Sheets

(56) References Cited

U.S. PATENT DOCUMENTS

| | | | |
|---|---|---|---|
| 7,934,152 B2* | 4/2011 | Krishnamurthy | G06F 17/2211 715/234 |
| 7,992,192 B2 | 8/2011 | Maher et al. | |
| 8,312,545 B2 | 11/2012 | Tuvell et al. | |
| 8,312,546 B2 | 11/2012 | Alme | |
| 8,345,707 B2* | 1/2013 | Stark | G06F 16/2246 370/464 |
| 8,375,450 B1 | 2/2013 | Oliver et al. | |
| 8,386,835 B2* | 2/2013 | Dilger | G06F 11/1004 711/216 |
| 8,468,601 B1 | 6/2013 | Bakhmutov | |
| 8,549,624 B2 | 10/2013 | Alme | |
| 8,554,800 B2* | 10/2013 | Goldentouch | G06F 16/81 707/797 |
| 8,640,245 B2 | 1/2014 | Zaitsev et al. | |
| 8,763,121 B2 | 6/2014 | Hentunen | |
| 8,769,683 B1 | 7/2014 | Oliver | |
| 8,769,689 B2 | 7/2014 | Hoglund | |
| 8,862,810 B2* | 10/2014 | Lee | G06F 3/061 711/103 |
| 9,081,961 B2 | 7/2015 | Yermakov et al. | |
| 9,223,789 B1* | 12/2015 | Seigle | G06F 16/113 |
| 9,311,324 B2* | 4/2016 | Irizarry, Jr. | G06F 16/178 |
| 9,367,448 B1* | 6/2016 | Botelho | G06F 12/0253 |
| 2003/0023865 A1 | 1/2003 | Cowie et al. | |
| 2005/0050342 A1* | 3/2005 | Boivie | G06F 21/64 713/193 |
| 2007/0038572 A1* | 2/2007 | Pastorelli | H04L 63/10 705/52 |
| 2008/0201722 A1 | 8/2008 | Sarathy | |
| 2009/0064323 A1 | 3/2009 | Lin | |
| 2009/0183056 A1 | 7/2009 | Aston | |
| 2010/0115620 A1 | 5/2010 | Alme | |
| 2010/0205665 A1 | 8/2010 | Komili et al. | |
| 2010/0332446 A1* | 12/2010 | Ahrens | G06F 16/10 707/609 |
| 2011/0067108 A1 | 3/2011 | Hoglund | |
| 2013/0340080 A1 | 12/2013 | Gostev et al. | |
| 2014/0047544 A1 | 2/2014 | Jakobsson | |
| 2014/0230006 A1 | 8/2014 | Burke et al. | |
| 2015/0134972 A1 | 5/2015 | Martin et al. | |
| 2015/0172300 A1 | 6/2015 | Cochenour | |

OTHER PUBLICATIONS

EPO Extended Search Report and Writtten Opinion in European Application No. 15811662.4 dated Dec. 5, 2017; 10 pages.

JPO Jan. 30, 2018 Office Action from Japanese Patent Application 2016-568831; 4 pages [English machine translation attached].

KIPO Apr. 26, 2018 Notice of Allowance from Korean Application No. 10-2016-7032660 with English Translation; 4 pages.

Kornblum, et al., "Identifying almost identical files using context triggered piecewise hashing," Digital Investigation, vol. 3, Sep. 1, 2006, pp. 91-97.

KIPO Oct. 24, 2017—Korean Patent Office Notice of Preliminary Rejection in Korean Patent Application No. 2016-7032660 dated Oct. 24, 2017, 4 pages.

PCT Sep. 25, 2015—International Search Report and Written Opinion in International Application No. PCT/US2015/038097, dated Sep. 25, 2015, 13 pages.

PCT Dec. 27, 2016—International Preliminary Report on Patentability in International Application No. PCT/US2015/038097, dated Dec. 27, 2016, 11 pages.

PRC Sep. 21, 2018 Notice of the First Office Action from Chinese Application No. 201580027577.4 dated Sep. 21, 2018; 16 pages.

* cited by examiner

MITIGATION OF MALWARE

RELATED APPLICATIONS

This Application is a continuation (and claims the benefit of priority under 35 U.S.C. § 120) of U.S. application Ser. No. 15/290,185, filed Oct. 11, 2016, entitled "MITIGATION OF MALWARE," Inventors Christoph Alme et al., which is a continuation (and claims the benefit of priority under 35 U.S.C. § 120) of U.S. application Ser. No. 14/318,406, filed Jun. 27, 2014 and issued Oct. 11, 2016 as U.S. Pat. No. 9,465,939, entitled "MITIGATION OF MALWARE," Inventors Christoph Alme et al. The disclosures of the prior applications are considered part of (and are incorporated by reference in) the disclosure of this application.

TECHNICAL FIELD

This disclosure relates in general to the field of information security, and more particularly, to the mitigation of malware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EMBODIMENTS

Figure 1:
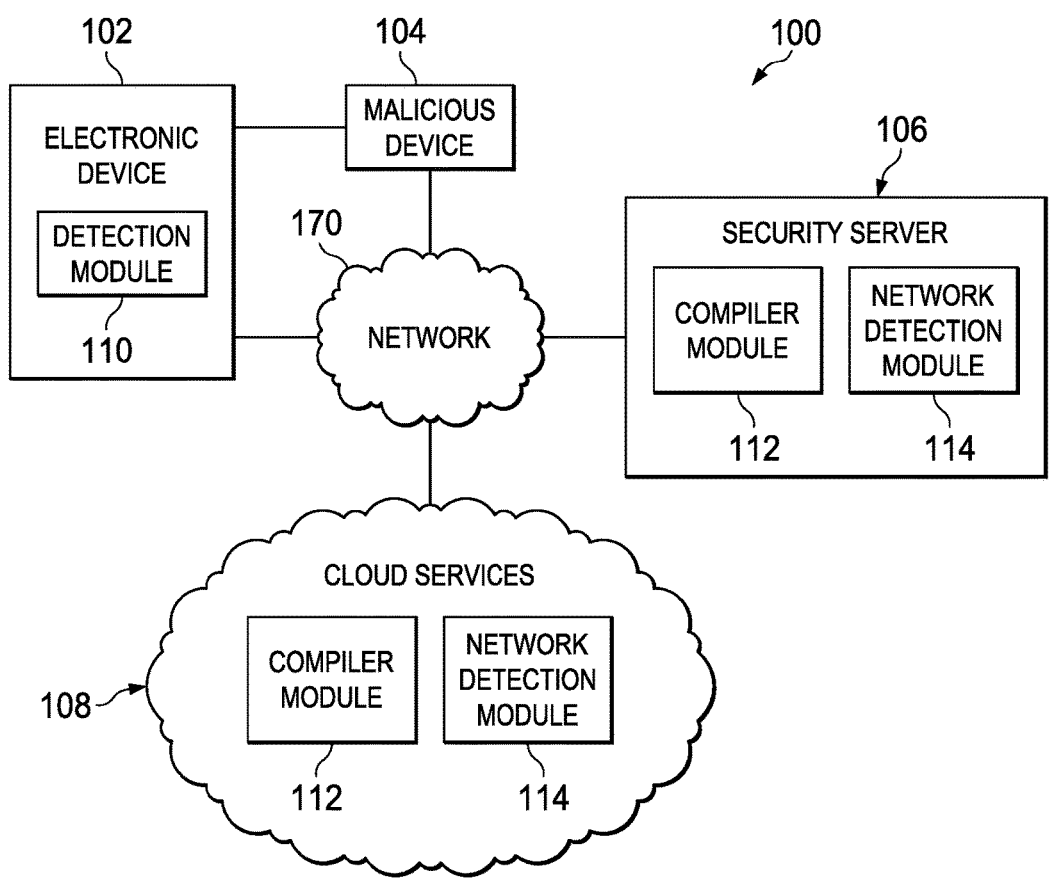
FIG. 1 is a simplified block diagram of a communication system for the mitigation of malware in a network environment in accordance with an embodiment of the present disclosure.

FIG. 1 is a simplified block diagram of a communication system 100 to help mitigate malware in a network environment. Communication system 100 can include an electronic device 102, a security server 106, and cloud services 108. Electronic device can include a detection module 110. Security server 106 can include a compiler module 112 and a network detection module 114. Could services 108 can also include compiler module 112 and network detection module 114. A malicious device 104 may attempt to introduce malware to electronic device 102. Electronic device 102, malicious device 104, security server 106, and cloud services 108 can be connected through network 170. In one example, malicious device 104 may be physically connected to electronic device 102 (e.g., through a Universal Serial Bus (USB) type connection).

In example embodiments, communication system 100 can be configured to combat known malware threats and new malware variant threats from malicious device 104 by using machine-learning training to generate classification intelligence in the form of one or more checksum trees. Using compiler module 112, communication system 100 can determine a series of fuzzy checksums per file (both malicious and safe) and track the overall prevalence of the checksums on a complete training set. Compiler module 112 can then produce a checksum tree of the most prevalent checksum series. The checksum tree can be augmented by any additional file characteristics, such as geometric (file size, entropy, number of sections, etc.) or behavioral characteristics (performs unpacking, invokes Winlnet APIs, etc.). At runtime, using detection module 110, the checksum tree can be interpreted, a checksum for a file can be computed at a respective (logical) file position or substring of the file, and the checksum for the file can be compared to checksums stored within a tree node of the checksum tree. A "logical" file position can be, for example, the entry-point area of an executable file, the end of an executable's code section, and the like. Any classification node or leaf of a checksum tree that is reached through a matching node is remembered and can be assigned a classification. Detection module 110 can be configured to perform a statistical voting across the individual classifications that have occurred (e.g., identifying a series of occurred matches such as a 90% probability the file includes Win32.IRCBot and an 80% probability the file includes Win32.FakeAlert.B).

If the overall detection probability is below a configurable threshold (e.g., below 90%), then detection module 110 can calculate a pre-defined, more detailed series of fuzzy checksums from the scanned file, serialize the series of fuzzy checksums into a feature vector, and transmit the feature vector to security server 106 or cloud services 108 where a more extensive classification checksum tree is available in network detection module 114 and a more accurate classification decision of the file can occur. The term "feature vector" is to include a fixed-size list of attributes, such as the checksums per file. Detection module 110, compiler module 112, and network detection module 114 can be distributed across an on premise system or network scanners (that requiring high scan performance and reasonably low memory footprint) and cloud services that can rely on more extensive and dedicated hardware to host significantly larger classification data. The supply of file data in the feature vector to network detection module 114 allows compiler module 112 to dynamically tune and re-train the detection module 110 and network detection module 114 in regular intervals. Data privacy is supported as only a vector of non-reversible fuzzy checksums is submitted to cloud services 108 and security server 106 and neither the original file, nor any substring of it, nor its source URL need to be submitted.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Increased access to the Internet has had the unintended effect of increasing the reach of software programs that capture personal information of users without their informed consent or that corrupt computers without the user's knowledge and informed consent. The term malware as used herein includes any type of software programs designed to infiltrate, modify, change, corrupt, or damage a computer system without the owner's informed consent, regardless of the motivation for the software program, and regardless of the results caused by the software program on the owner's devices, systems, networks, or data.

Various security programs may be used to attempt to detect the presence of malware. In some instances, the security programs rely on detecting a signature in a file being examined to determine if the file is or contains malware. In some instances, a security program may use a checksum based method to determine whether a file is malware. However, malware authors frequently change parts of the malware file in order to avoid detection by signature or checksum methods. New variants of known malware may be created by re-packing or compiling within short time intervals in order to evade signature or checksum based detection and to take advantage of the delay in creating and distributing updated detection signatures or checksums.

Vendors of security programs try to counteract the increased amount of new malware variants and samples by using more generic and more heuristic detections. However, generic detections bear the deficiency of requiring manual analysis of one or, in most cases at least two, malware variant(s) in order to provide appropriate detection. Further, heuristic detections bear the deficiency of false positives.

A communication system for mitigating malware, as outlined in FIG. 1, can resolve these issues (and others). In communication system 100 of FIG. 1, to combat malware threats and new malware variants threats from malicious device 104, the system may use checksum trees of fuzzy checksums to implement pro-active protection from new malware variants (or "zero-day" malware variants). Re-compiled or repackaged variants of malware families, or new malware that reuses components from previous malware families, can be detected in a generic fashion, protecting all users, including the first victims (or "patient zero's") of the malware that would have been sacrificed in traditional reactive approaches.

Communication system 100 can be configured to help mitigate malware by using fuzzy rolling checksums in a checksum tree to detect new or "zero-day" malware. "Fuzzy" means the checksum does not just match the same portion of data from which it was originally computed but it also matches on close relatives having a low or relatively low edit-distance. "Rolling" means the checksum comparison is performed in a reasonably position-independent manner. As such, the process can be more accurate and more file format agnostic than previous methods where the transformation of code into an entropy graph removes too much information and/or requires deep disassembly, emulation, and understanding of the malware. The malware detection can be scalable with respect to various aspects such as the detection rate vs. false rate vs. memory footprint vs. scan performance ratio and each aspect can be controlled at run time without algorithmic changes by altering the number of checksums used per file, the allowed position deviation in the rolling checksum comparison, and the percentage or score (e.g., Bayesian score or some other similar type score) assigned per checksum match. The malware detection can include a series of fuzzy checksums that identify the closest relationships of a new unknown malware to existing known malware variants and components. As a result, a checksum computed on malware variant M1, is still likely to match on descendant M2 even if malware variant M1 is extended with new code, code is removed, recompiled or repackaged, etc.

The detection of the malware can work in a staged manner across multiple systems, such as performing a first "down-selection" on a locally installed "on premise" network scanner, and then, upon initial matching, off load the detailed classification to connected cloud services or a server as a feature vector. Due to the fixed size of the feature vector, a detection module can relatively easily compute the feature vector needed for a thorough analysis by a network detection module in cloud services (or a security server). The detection module can send the feature vector to the cloud services (or the security server), and the checksums in the feature vector can be compared against a bigger checksum tree located in the cloud services (or the security server). This allows the system to keep the data foot print on local devices (e.g., electronic device 102) small without having to sacrifice accuracy. The ratio between detection rate and false-positive rate can be configured as desired, based on the size of the series of checksums required to detect malware. For example, an aggressive detection could require only 4 checksums to match per file, while a more accurate detection could require 32 checksums to match and so on.

In addition, the amount of CPU cycles needed to calculate and compare a checksum is relative to the size of the checksum range (e.g., 256 bytes), and the number of such ranges can be fixed per file (e.g., fixed to the size of the used feature vector). Neither the size of the file nor the size of the classification data base has much impact on performance (except for a very small I/O related fraction). The process can provide O(1) performance characteristics, while traditional full file hash-based detection lists have O(n+log m) performance characteristics (e.g., file size*list size). The term "O(1)" means the performance is fixed where neither the size of the scanned file nor the size of the checksum tree impact the performance. The performance always stays more or less the same, no matter whether a small file is scanned against a small database, or a huge file is scanned against a huge database. The term "O(n+log m)" means the performance depends on both the size of the scanned file (n representing file size) and the size of the tree, which is log m. The term "m" representing the total amount of nodes in the tree and the lookup performance is a logarithm of m because it is stored as a sorted tree (e.g., "red-black" binary tree) and not as a sequential list.

Also, the system can allow for delivery of a list of family relationships, each with a relationship likelihood. That is, rather than just returning a single detection name, the system can return a list such as "Win32.IRCBot.D":90%, "Win32.FakeAlert.B":80%, and "Win32.AutoRun.X":70%. In an example, to determine the percentages, probability values for each matching node in a checksum tree can be stored. The probability value can be derived from the prevalence of a checksum in the malware and benign file training sets as compared to clean training sets. Further, the classification data can be generated completely through data mining and machine-learning techniques, based on reasonably sized (100,000+) malware and benign file sample sets. Thus, there is no need for manual rule authoring.

Communication system 100 can be configured to use a training set of both known malicious and known benign file samples to generate the classification intelligence of a checksum tree. From each sample, communication system 100 can determine a series of fuzzy checksums and track the overall prevalence of any checksum on a complete training set. Using the training set, communication system 100 can then produce a checksum tree that reflects a series of those checksums that have been proven to be most prevalent in the malware set and benign file set. Each node in the checksum tree can consist of the (logical) position of the checksum in the file, and the checksum itself. The position can reflect a numeric offset (e.g., +2048 bytes from file start), or a pre-defined format specific logical offset or substring (e.g., at the entry point of an executable fie, in the middle of the resources section, etc.).

At runtime, communication system 100 can be configured to interpret the checksum tree such that it descends from the root node(s) and for each node in the checksum tree, computes the checksum at the respective file position and compares the checksum to the checksum stored with the checksum tree node. The leaf nodes (or at least a majority of the leaf nodes) in the checksum tree have a class label or classification assigned. The assigned classification specifies the most likely malware family name (e.g., Win32.IRCBot.D) or benign file name (e.g., Win32.FakeAlert.B,*CLEAN*, etc.) and can assign a match likelihood (e.g., 0 . . . 100%) based on the node or nodes that match the file checksum and how well the file checksum matches the node. Any classification that is reached through matching nodes is remembered and a voting across the individual classifications is preformed to come up with the most likely classification. In one example, a probability sum is created using a weighted combination of the individual detections. More specifically, a Random Forest classifier may be used with Bayesian voting across the matching classification nodes.

When a file, program, or data is received by electronic device 102, detection module 110 can be configured to apply a file-format specific decomposition such as unpacking compressed content (e.g., unpacking packed Executables, SWF videos, ZIP Archives, PDF document streams, etc.). Normalization may be applied on each data substring that is to be checksummed. If the data is known to be executable code, the data can be disassembled (recursive-traversal) and the operands of each instruction may be normalized down to a general form (such as only representing the operand type, like REGister or MEMory). The starting position for disassembly can be determined based on the file type, size of file, or some other processes for determining the starting position. On arbitrary data, detection module 110 can apply a binary bit-wise normalization to reduce the variance of byte values. Then, an initial checksum C can be computed on the beginning of the data substring, from byte positions N to M, where the checksum algorithm can derive the checksum of the checksum range N+x to M+x from C without having to recompute the checksum range. For example, a Rabin-Karp algorithm or some other algorithm may be used to derive the checksum. A comparison is then performed for each node in the checksum tree(s) such that the desired comparison position is defined by each node. The rolling checksum(s) is computed on the respective sliding window of the substring (depending on the desired search span) and the checksum is compared at each byte position against the checksum stored in the checksum tree node. For example, the comparison may start at a 32-bit aligned offset and then advance by 4 bytes for each rolling checksum. The checksum range for each node in a checksum tree can be included in the respective node of the checksum tree.

Turning to the infrastructure of FIG. 1, communication system 100 in accordance with an example embodiment is shown. Generally, communication system 100 can be implemented in any type or topology of networks. Network 170 represents a series of points or nodes of interconnected communication paths for receiving and transmitting packets of information that propagate through communication system 100. Network 170 offers a communicative interface between nodes and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, security server 106, and cloud services 108 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Cloud services 108 is generally defined as the use of computing resources that are delivered as a service over a network, such as the Internet. Typically, compute, storage, and network resources are offered in a cloud infrastructure, effectively shifting the workload from a local network to the cloud network.

In regards to the internal structure associated with communication system 100, each of electronic device 102, security server 106, and cloud services 108 can include memory elements for storing information to be used in the operations outlined herein. Each of electronic device 102, security server 106, and cloud services 108 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, security server 106, and/or cloud services 108, may include software modules (e.g., detection module 110, compiler module 112, and/or network detection module 114) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, malicious device 104, security server 106, and cloud services 108 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Security server 106 can be a network element such as a server or virtual server and can be associated with clients, customers, endpoints, or end users wishing to initiate a communication in communication system 100 via some network (e.g., network 170). The term 'server' is inclusive of devices used to serve the requests of clients and/or perform some computational task on behalf of clients within communication system 100. Although detection module 110, compiler module 112 and network detection module 114 are represented in FIG. 1 as separate modules, this is for illustrative purposes only. These modules could be combined or separated in any suitable configuration. Furthermore, these modules could be integrated with or distributed in cloud services 108 or security server 106 or in another network accessible by electronic device 102.

Figure 2:
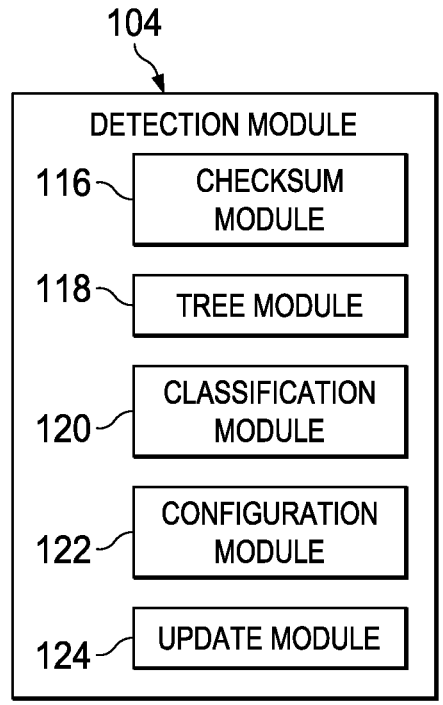
FIG. 2 is a simplified block diagram of a detection module in a network environment in accordance with an embodiment of the present disclosure.

Turning to FIG. 2, FIG. 2 illustrates one example of detection module 110. Detection module 110 can include a checksum module 116, a tree module 118, a classification module 120, a configuration module 122, and an update module 124. Checksum module 116 can be configured as a checksum calculator and comparator. Checksum module 116 may use a series of fuzzy checksums, to identify benign files, existing malware, and new unknown malware. A checksum computed on malware variant M1, is still likely to match on descendant M2 even if the variant malware has been extended with new code, code removed, recompiled or repackaged.

Tree module 118 can be configured as a checksum tree database and interpreter. Tree module 118 can reflect the series of checksums that have been proven to be most prevalent in benign file and known malware sets. Each node in each checksum tree consists of the (logical) position of the checksum in a file or substring, and the checksum itself. The position can reflect a numeric offset (e.g., +2048 bytes from file start), or a pre-defined format specific logical offset (e.g., at the entry point of the executable fie, in the middle of the resources section, etc.).

Classification module 120 can be configured as a classification queue and voter. Classification module 120 can create a list of family relationships, each with a relationship likelihood. That is, rather than just returning a single detection name (e.g., Win32.IRCBot.D), classification module 120 can return a list such as Win32.IRCBot.D:90% (a backdoor Trojan), Win32.FakeAlert.B:80% (a benign file that gives a false or fake alert), and Win32.AutoRun.X:70% (a Trojan). The classification data can be generated completely through data mining and machine-learning techniques using existing known malware and benign file variants and components. The existing known malware and benign file variants and components may be reasonably sized (100,000+) malware and benign file sample sets. There is no need for manual rule authoring.

Configuration module 122 can be configured to change the ratio between the detection rate and the false-positive rate as desired. The ratio can be based on the size of the series of checksums used on a file. For example, an aggressive detection could require only 4 checksums to match per file, while a more accurate detection could require 32 checksums to match and so on. The amount of CPU cycles needed to calculate and compare a checksum is relative to the size of the checksummed range (e.g., 256 bytes). The number of such ranges can be fixed per file (e.g., fixed to the size of a feature vector). Neither the size of the file nor the size of the classification data base will impact the performance, except for a small I/O related fraction. This offers one advantage in that O(1) performance characteristics can be provided, while traditional full file hash-based detection lists have O(n+log m) performance characteristics (file size*list size).

Update module 124 can be configured to receive updated versions of generated checksum trees for storage in tree module 118. Security server 106 or cloud services can be operable to, at certain intervals or as new checksum trees are generated, to update tree module 118 with new checksum trees. In various embodiments, update module 124 controls the updating of tree module 118 with new checksum trees from compiler module 112 in security server 106 or in cloud services 108.

Figure 3:
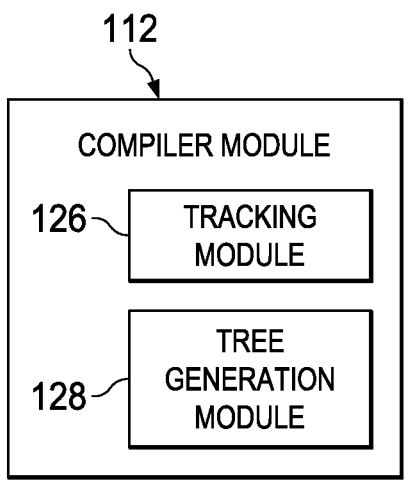
FIG. 3 is a simplified block diagram of a complier module in a network environment in accordance with an embodiment of the present disclosure.

Turning to FIG. 3, FIG. 3 illustrates one example of compiler module 112. Compiler module 112 can include a tracking module 126 and a tree generation module 128. Tracking module 126 can be configured to track known and new malware as well as benign files. Tracking module 126 can also send a request to tree generation module 128 for a new checksum tree to be generated for new malware and new benign files.

Tree generation module 128 can be configured to use a training set of both known malicious and known benign file samples to generate a checksum tree. From each file sample or substring, tree generation module 128 can determine a series of fuzzy checksums and track the overall prevalence of any checksum on a complete training set. Using the series of fuzzy checksums, tree generation module 128 can create and produce a checksum tree that can be configured to reflect a series of those checksums that have been proven to be most prevalent in a malware and benign file set. Each node in the checksum tree can consists of the (logical) position of the check sum in the file and the check sum itself. The position of the checksum can reflect a numeric offset (e.g., +2048 bytes from file start), or a pre-defined format specific logical offset (e.g., at the entry point of the executable fie, in the middle of the resources section, etc.).

Figure 4:
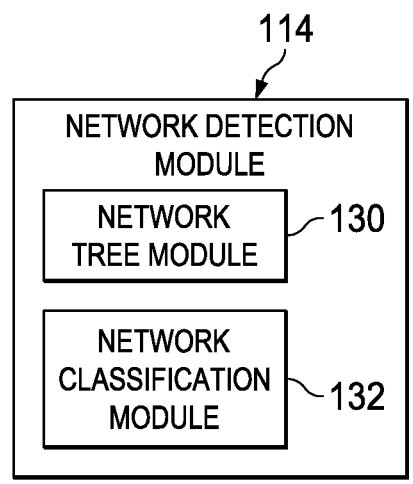
FIG. 4 is a simplified block diagram of a network detection module in a network environment in accordance with an embodiment of the present disclosure.

Turning to FIG. 4, FIG. 4 illustrates one example of network detection module 114. Network detection module 114 can include a network tree module 130 and a network classification module 132. Network tree module 130 can be configured to reflect checksum trees that are more extensive than the checksum trees in tree module 118. The checksum trees in network tree module 130 can include an extended series of checksums that have been proven to be most prevalent in a malware or benign file set. Each node in the checksum trees consists of the (logical) position of the check sum in the file, and the check sum itself. The position of the checksum can reflect a numeric offset (e.g., +2048 bytes from file start), or a pre-defined format specific logical offset (e.g., at the entry point of the executable fie, in the middle of the resources section, etc.). Network classification module 132 can be configured to allow for delivery of a list of family relationships, each with a relationship likelihood. That is, rather than just returning a single detection name such as Win32.IRCBot.D, network classification module can return a list such as Win32.IRCBot.D:90%, Win32.FakeAlert.B:80%, and Win32.AutoRun.X:70%. The classification data can be generated completely through data mining and machine-learning techniques using existing known malware and benign file variants and components. The known malware and benign file variants and components may be reasonably sized (100,000+) malware and benign file sample sets. There is no need for manual rule authoring.

Figure 5:
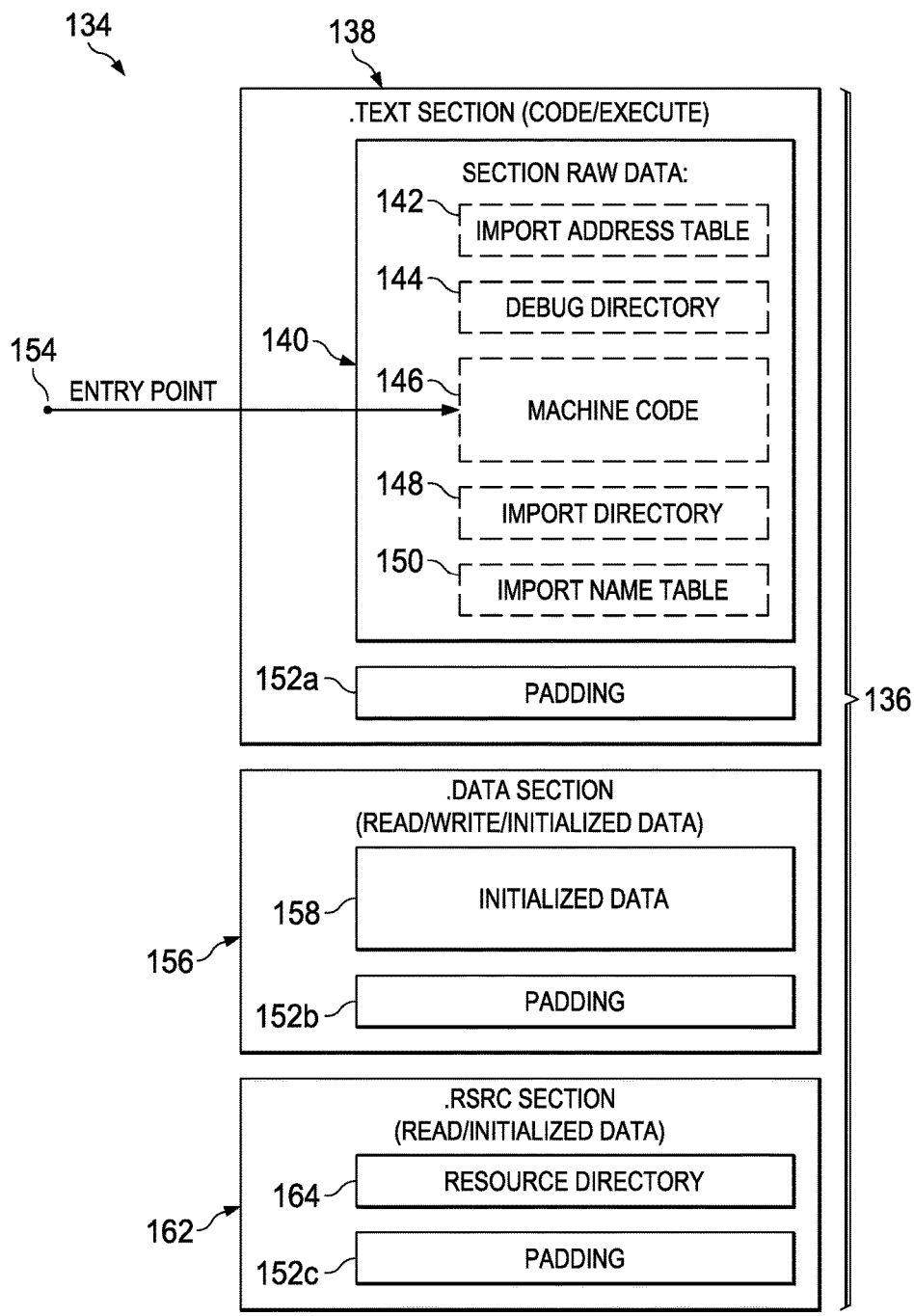
FIG. 5 is a simplified block diagram of an executable file layout in accordance with an embodiment of the present disclosure.

Turing to FIG. 5, FIG. 5 illustrates a diagram 134 of one possible layout for an executable file 136. In an embodiment, executable file 136 is a file that includes, or is, malware. In various embodiments, executable file 136 is a file that will have a checksum generated for the file so that the checksum for file 136 can be compared to nodes in a checksum tree. In various embodiments, file 136 includes code section 138, data section 156, and a resource section 162. In various embodiments, code section 138 includes a raw data section 140 and padding 152a. Raw data section 140 can include an import address table 142, a debug directory 144, machine code 146, an import directory 148, and an import name table 150. In various embodiments, data section 156 can include initialized data 158 and padding 152*b*. In various embodiments, resource section 162 can include a resource directory 164 and padding 152*c*.

Depending on the generating compiler and linker, the complexity level can vary throughout the different portions of file 136. Padding 152*a-c* are typically areas of very low information entropy and can be used as a measure of the complexity of code section 138, data section 156 or resource section 162 respectively. Import name table 150 and resource directory 164 are generally areas of low or medium information entropy. Machine code 146 is generally an area of medium information entropy. Machine code 146 is a likely point in file 136 to include programming causing file 136 to be malware. Consequently, at least one subfile from machine code 146 may be used and at least one checksum for file 136 may be created from machine code 146. In various embodiments, an entry point 154 may be chosen in machine code 146 for a starting point for comparing blocks used in the checksum for file 136 and for a comparison between a checksum and a node on the checksum tree.

Figures 6A, 6B:
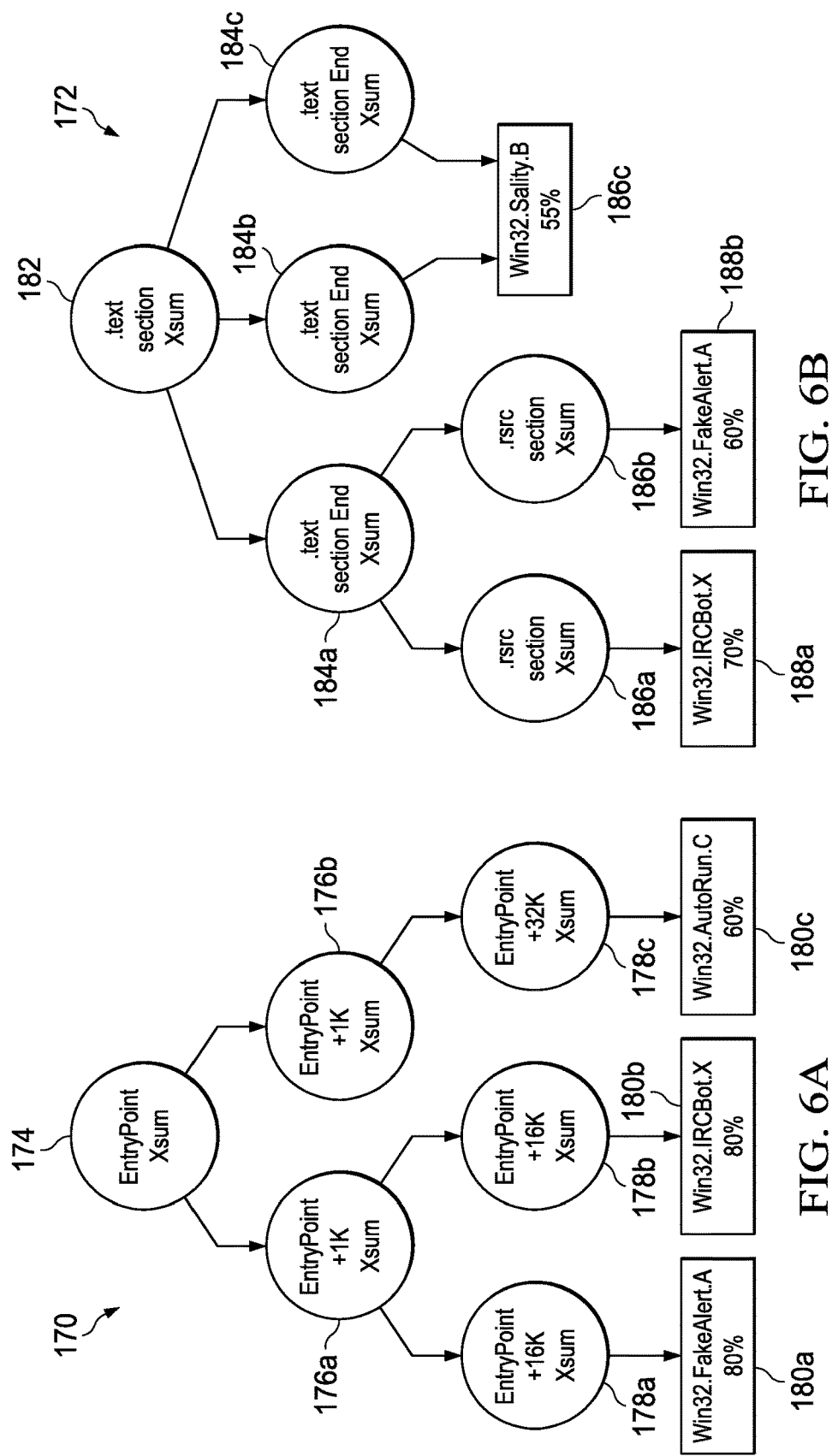
FIGS. 6A and B are a simplified block diagrams of checksum trees in accordance with an embodiment of the present disclosure.

Turing to FIG. 6A, FIG. 6A illustrates a possible first checksum tree 170. In an embodiment, first checksum tree 170 can include an entry point checksum node 174, second region checksum nodes 176*a* and *b*, third region checksum nodes 178*a-c*, and first checksum tree classifications 180*a-c*. Entry point checksum node 174 can be a checksum from a region or area of a file to be analyzed to determine if the file might be malware or contain malware or if the file is benign. Second region checksum nodes 176*a* and *b* can be a checksum from a region or area of a file that is a certain numbers of bytes from the region or area of the entry point checksum 174.

For example, in first checksum tree 170, FIG. 6A illustrates that second region checksums in second region checksum nodes 176*a* and *b* are one thousand (1,000) bytes from entry point checksum node 174. Third region checksums in third region checksum nodes 178*a* and *b* can be a region or area of a file that is a certain numbers of bytes from entry point checksum node 174. For example, FIG. 6A illustrates that third region checksum nodes 178*a-c* are sixteen thousand (16,000) bytes from the region or area of entry point checksum 174.

First checksum tree classifications 180*a-c* are used when a checksum from a substring of a file match a node in first checksum tree 170. For example, if a checksum from the substring matches initial checksum 174, then the file is checked to determine if a checksum matches second region checksums 176*a* and *b*. If there is a match, then the file is checked to determine if a checksum matches third region checksums 178*a-c*. After the nodes of checksum tree 170 have been checked, then a classification from first checksum tree classifications 180*a-c* is assigned to the file. For example, if a region of the file matches initial checksum 174, second region checksum 176*a*, and third region checksum 178*a*, then a WIN32.Fake.Alert classification may be assigned to the file. In an embodiment, the matching region can be analyzed based on the matching nodes and a percentage of likelihood for the WIN32.Fake.Alert classification being correct can be assigned to the classification. As illustrated in FIG. 6A, according to first checksum tree 170, a particular file may have an eighty percent (80%) chance of including WIN32.Fake.Alert (a fake alert), an 80% chance of including malware WIN32.IRCBot.X (a backdoor Trojan), and a sixty percent (60%) chance of including malware WIN32.AutoRun.C (a Trojan).

Turing to FIG. 6B, FIG. 6B illustrates a possible second checksum tree 172. In an embodiment, second checksum tree 172 can include can include a text section checksum 182, text section end checksums 184*a-c*, resource section checksum nodes 186*a* and *b*, and second checksum tree classifications 188*a-c*. In second checksum tree 172, text section checksum 182 may be a checksum for a specific area of a text file or may be for the entire text file. Text section end checksums 184*a-c* may be checksums for the end of the text file. Resource section checksum nodes 186*a* and *b* may be checksums for a resource section of the file.

In an example, if a checksum of the file matches text section checksum 182, then the file is checked to determine if a checksum matches text section end checksums 184*a*. If there is a match, then the file is checked to determine if a checksum matches resource section checksum nodes 186*a* or *b*. If there is a match, then a classification from second checksum tree classifications 188*a* or *b* can be assigned to the file. Also, if a checksum matches text section end checksums 184*b* or *c*, then a classification from second checksum tree classification 186*c* can be assigned to the file. For example, if a region of the file matches text section checksum 182, text section end checksum 184*a*, and resource section checksum node 186*a*, then a WIN32.IRCBot.X classification may be assigned to the file. In an embodiment, the matching region can be analyzed and a percentage of likelihood for the WIN32.IRCBot.X classification being correct can be assigned to the classification. As illustrated in FIG. 6B, according to checksum tree 172, a file may have a seventy percent (70%) chance of including malware WIN32.IRCBot.X, a 60% chance of including WIN32.Fake.Alert, and a fifty five percent (55%) chance of including malware WIN32.Sality.B (a Trojan dropper).

Figure 7:
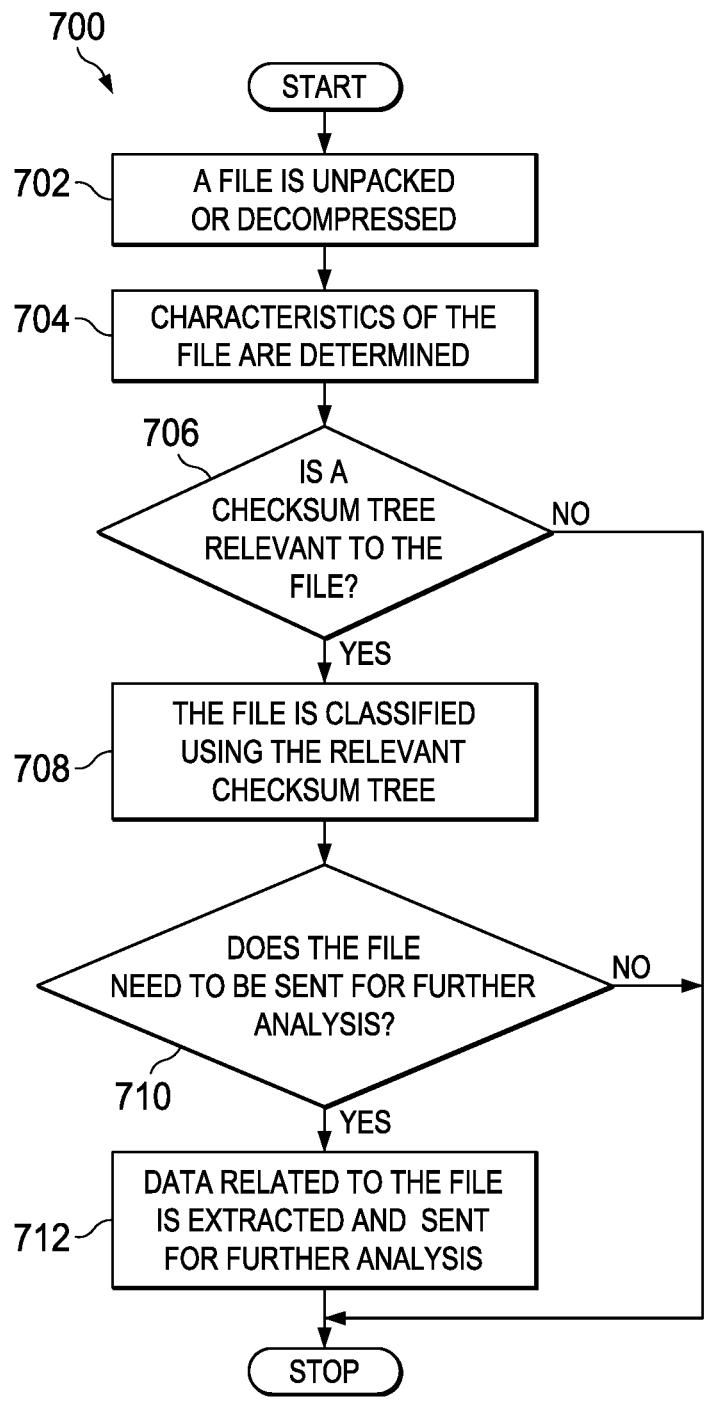
FIG. 7 is a simplified flowchart illustrating potential operations that may be associated with an embodiment of the present disclosure.

Turning to FIG. 7, FIG. 7 is an example flowchart illustrating possible operations of a flow 700 that may be associated with mitigation against malware, in accordance with an embodiment. In an embodiment, one or more operations of flow 700 may be performed by detection module 110. At 702 a file is unpacked or decompressed. At 704, characteristics of the file are determined. A 706, the system determines if a (or any) checksum tree is relevant to the file. For example, the system may determine if any of the checksum trees in tree module 118 are relevant to the file. If no checksum tree is relevant to the file, then the process ends. If a checksum tree is relevant to the file, then the file is classified using the relevant checksum tree, as in 708. For example, the file may be classified as malicious or benign. At 710, the system determines if the file needs to be sent for further analysis. If the file needs to be sent for further analysis, then data related to the file is extracted and sent for further analysis, as in 712. For example, if the classification of the file has less than a 90% probability that the file is malicious (or benign), then a feature vector may be sent to security server 106 or cloud services 108 for further analysis using network detection module 114. If the file does not need to be sent for further analysis, then the process ends. For example, if a checksum for the file matches a node in the checksum tree that has an over 90% likelihood the file includes malware, then it is very likely (e.g., over a 90% probability) that the file contains malware and no further analysis is needed.

Figure 8:
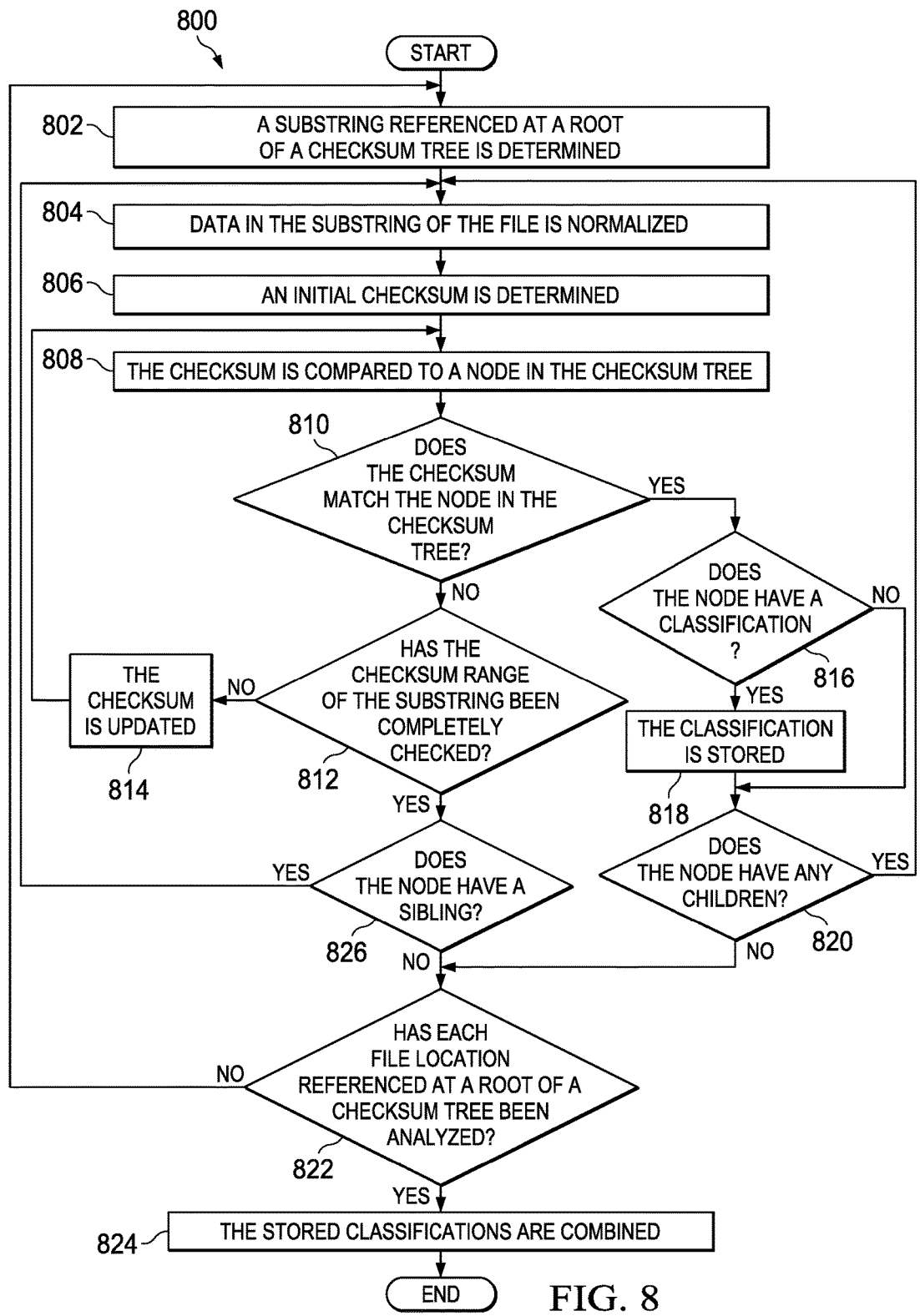
FIG. 8 is a simplified flowchart illustrating potential operations that may be associated with an embodiment of the present disclosure.

Turning to FIG. 8, FIG. 8 is an example flowchart illustrating possible operations of a flow 800 that may be associated with mitigation against malware, in accordance with an embodiment. In an embodiment, one or more operations of flow 800 may be performed by detection module 104 or network detection module 114. At 802, a substring referenced at a root of a checksum tree is determined. For example, the root of the checksum tree may be entry point checksum node 174 illustrated in FIG. 6A. At

804, data in the substring of the file is normalized. At 806, an initial checksum is determined. At 808, the checksum is compared to a node in the checksum tree. At 810, the system determines if the checksum matches the node in the checksum tree.

If the checksum does match the node in the checksum tree, then the system determines if the node has a classification, as in 816. If the node does not have a classification, then the system determines if the node has any children, as in 820. If the node does have a classification, then the classification is stored, as in 818, and the system determines if the node has any children, as in 820. If the node does have any children, then the system goes back to 804 and data in the substring of the file is normalized. If the node does not have any children, then they system determines if each file location referenced at a root of a checksum tree has been analyzed, as in 822. This ensures that all of the checksum trees that are relevant to the file are analyzed. For example, tree module 118 may include 2, 5, 10 or any number of checksum trees that are relevant to a file. If each file location referenced at a root of a checksum tree has been analyzed, then the stored classifications (if any) are combined, as in 824. If each file location referenced at a root of a checksum tree has not been analyzed, then they system goes back to 802 and a substring referenced at a root of a (new) checksum tree is determined. This allows a single file to be analyzed using multiple checksum trees.

Going back to 810, if the checksum does not match a node in the checksum tree, then the system determines if the checksum range of the substring has been completely checked, as in 812. If the checksum range of the substring has not been completely checked, then the checksum is updated, as in 814, and the (updated) checksum is compared to a node in a checksum tree, as in 808. This allows the system to perform the rolling checksum analysis. If the checksum range of the file has been completely checked, then the system determines if the node has a sibling, as in 826. For example, as illustrated in FIG. 6A second regions checksum node 176*a* is a sibling to second region checksum node 176*b*. It is possible to have many siblings under a root node as well as any other node in the checksum tree and this ensures that each sibling under a matching node is analyzed. If the node does have a sibling, then then they system determines if each file location referenced at a root of a checksum tree has been analyzed, as in 822.

Figure 9:
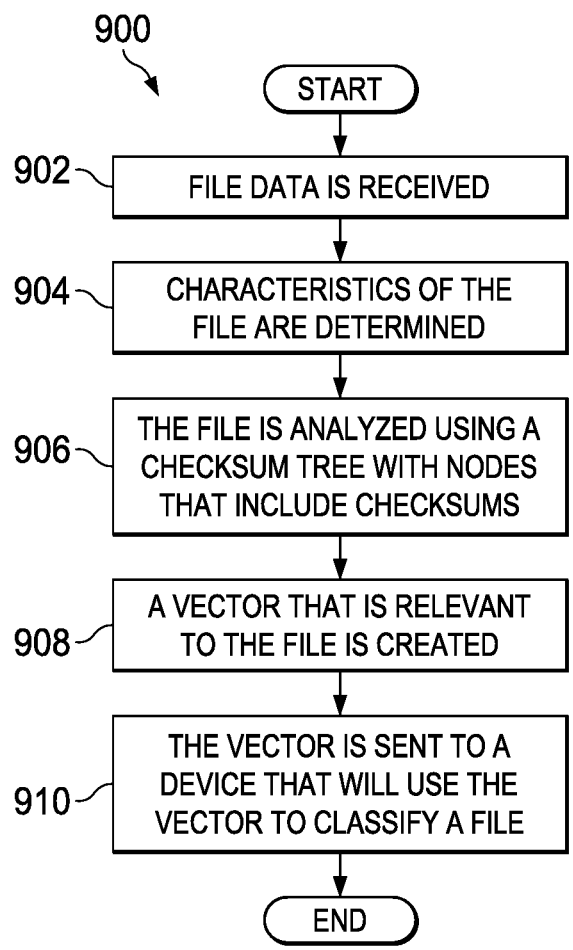
FIG. 9 is a simplified flowchart illustrating potential operations that may be associated with an embodiment of the present disclosure.

Turning to FIG. 9, FIG. 9 is an example flowchart illustrating possible operations of a flow 900 that may be associated with mitigation against malware, in accordance with an embodiment. In an embodiment, one or more operations of flow 900 may be performed by detection module 110. At 902, file data is received. At 904, characteristics of the file are determined. At 906, the file an analyzed using a checksum tree with nodes that include fuzzy checksums. At 908, based on the analysis of the file using the checksum tree, a vector that is relevant to the file is created. At 910, the vector is sent to a device that will use the vector to classify the file.

Figure 10:
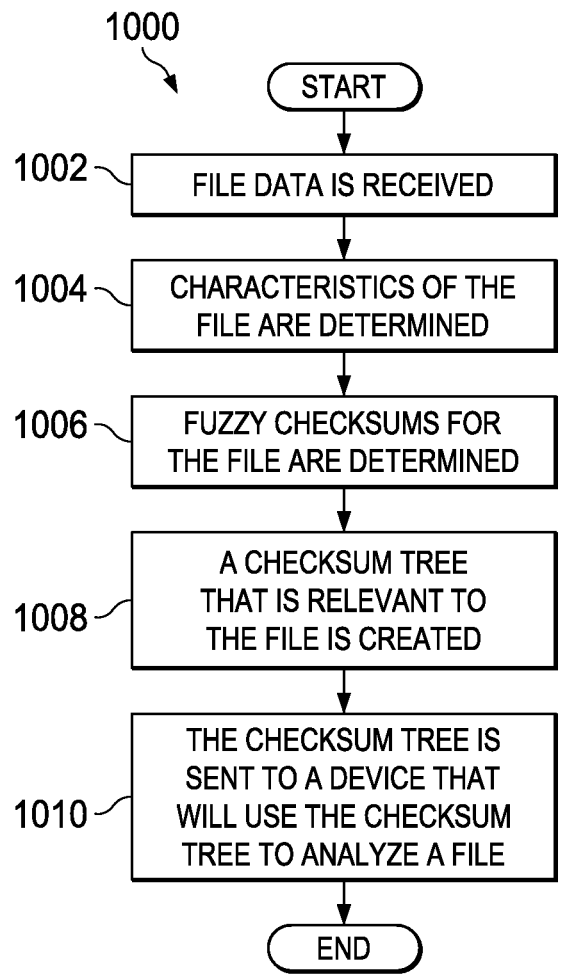
FIG. 10 is a simplified flowchart illustrating potential operations that may be associated with an embodiment of the present disclosure.

Turning to FIG. 10, FIG. 10 is an example flowchart illustrating possible operations of a flow 1000 that may be associated with mitigation against malware, in accordance with an embodiment. In an embodiment, one or more operations of flow 1000 may be performed by compiler module 112. At 1002, file data is received. The file data may be related to new malware or a new benign file. At 1004, characteristics of the file are determined. At 1006, fuzzy checksums for the file are determined. At 1008, a checksum tree that is relevant to the file is created. The checksum tree may be a new checksum tree that will be used to identify the new malware or new benign file. At 1010, the checksum tree is sent to a device that will use the checksum tree to analyze an unknown file received by the device.

Figure 11:
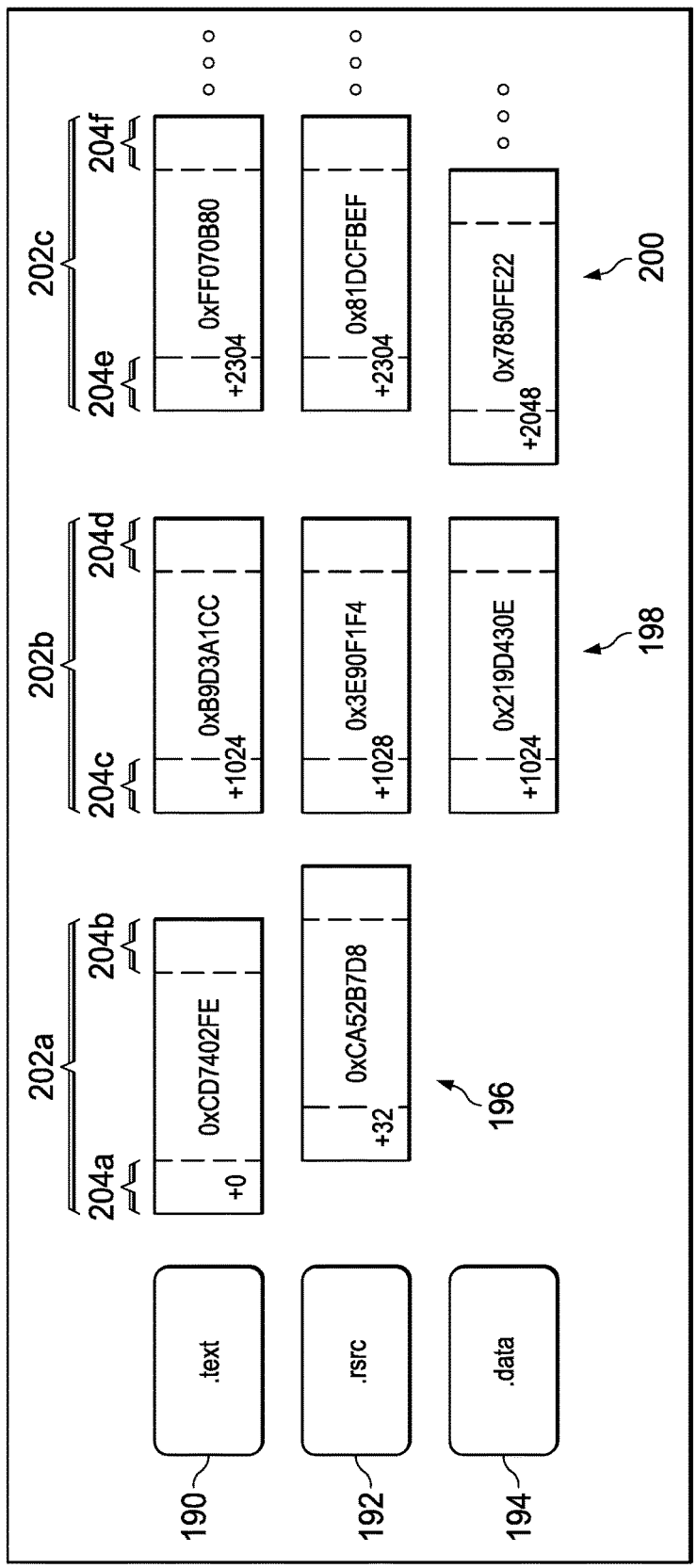
FIG. 11 is a simplified block diagram of file checksums in accordance with an embodiment of the present disclosure.

Turning to FIG. 11, FIG. 11 is an example of a series of checksums for a text file 190, resource file 192, and data file 194. For example, substrings 202*a-c* may be a portion of a text file such as a Word document that is checksummed. Also, substrings 202*a-c* can be an entire feature vector or a portion of a feature vector. Rolling search ranges 204*a-c* can be areas of the substrings 202*a-c* that are used to compare against a checksum tree (e.g., checksum tree 172) to determine if the file might be malicious or a benign file. Also, the series of substrings illustrated in FIG. 10 may be used to create checksums and nodes of a checksum tree. For example, a specific type of malware may have known code that is found at 1,104 bytes from the beginning of the file. Rolling search range 204*c* can represent a fuzzy checksum node on a checksum tree that is used to analyze a file for the known code.

Figure 12:
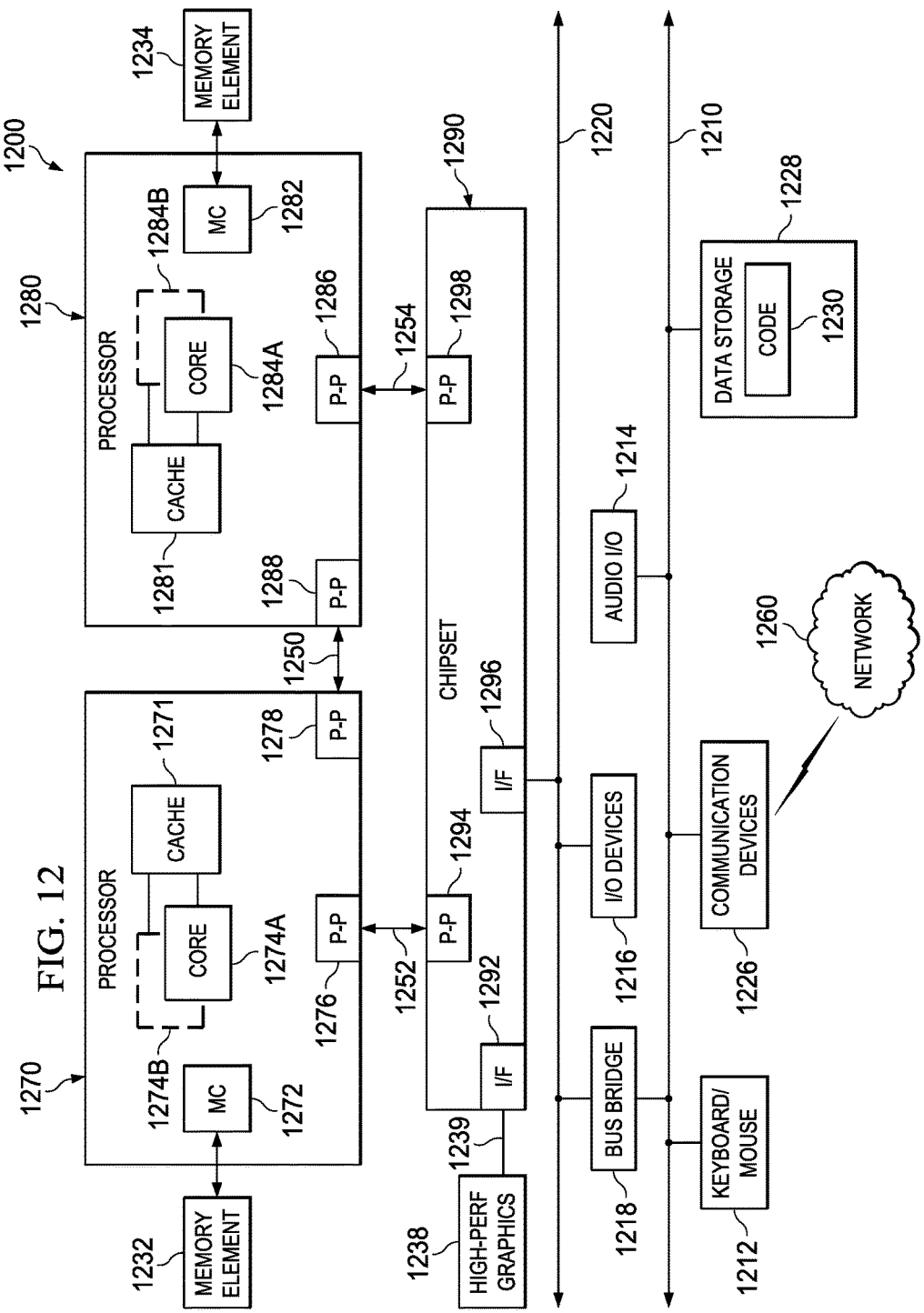
FIG. 12 is a block diagram illustrating an example computing system that is arranged in a point-to-point configuration in accordance with an embodiment.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces. Generally, one or more of the network elements of communication system 100 may be configured in the same or similar manner as computing system 1200.

As illustrated in FIG. 12, system 1200 may include several processors, of which only two, processors 1270 and 1280, are shown for clarity. While two processors 1270 and 1280 are shown, it is to be understood that an embodiment of system 1200 may also include only one such processor. Processors 1270 and 1280 may each include a set of cores (i.e., processor cores 1274A and 1274B and processor cores 1284A and 1284B) to execute multiple threads of a program. The cores may be configured to execute instruction code in a manner similar to that discussed above with reference to FIGS. 7-10. Each processor 1270, 1280 may include at least one shared cache 1271, 1281. Shared caches 1271, 1281 may store data (e.g., instructions) that are utilized by one or more components of processors 1270, 1280, such as processor cores 1274 and 1284.

Processors 1270 and 1280 may also each include integrated memory controller logic (MC) 1272 and 1282 to communicate with memory elements 1232 and 1234. Memory elements 1232 and/or 1234 may store various data used by processors 1270 and 1280. In alternative embodiments, memory controller logic 1272 and 1282 may be discrete logic separate from processors 1270 and 1280.

Processors 1270 and 1280 may be any type of processor and may exchange data via a point-to-point (PtP) interface 1250 using point-to-point interface circuits 1278 and 1288, respectively. Processors 1270 and 1280 may each exchange data with a control logic 1290 via individual point-to-point interfaces 1252 and 1254 using point-to-point interface circuits 1276, 1286, 1294, and 1298. Control logic 1290 may also exchange data with a high-performance graphics circuit 1238 via a high-performance graphics interface 1239, using an interface circuit 1292, which could be a PtP interface circuit. In alternative embodiments, any or all of the PtP links illustrated in FIG. 12 could be implemented as a multi-drop bus rather than a PtP link.

Control logic 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a keyboard/mouse 1212 (or other input devices such as a touch screen, trackball, etc.), communication devices 1226 (such as modems, network interface devices, or other types of communication devices that may communicate through a computer network 1260), audio I/O devices 1214, and/or a data storage device 1228. Data storage device 1228 may store code 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 13:
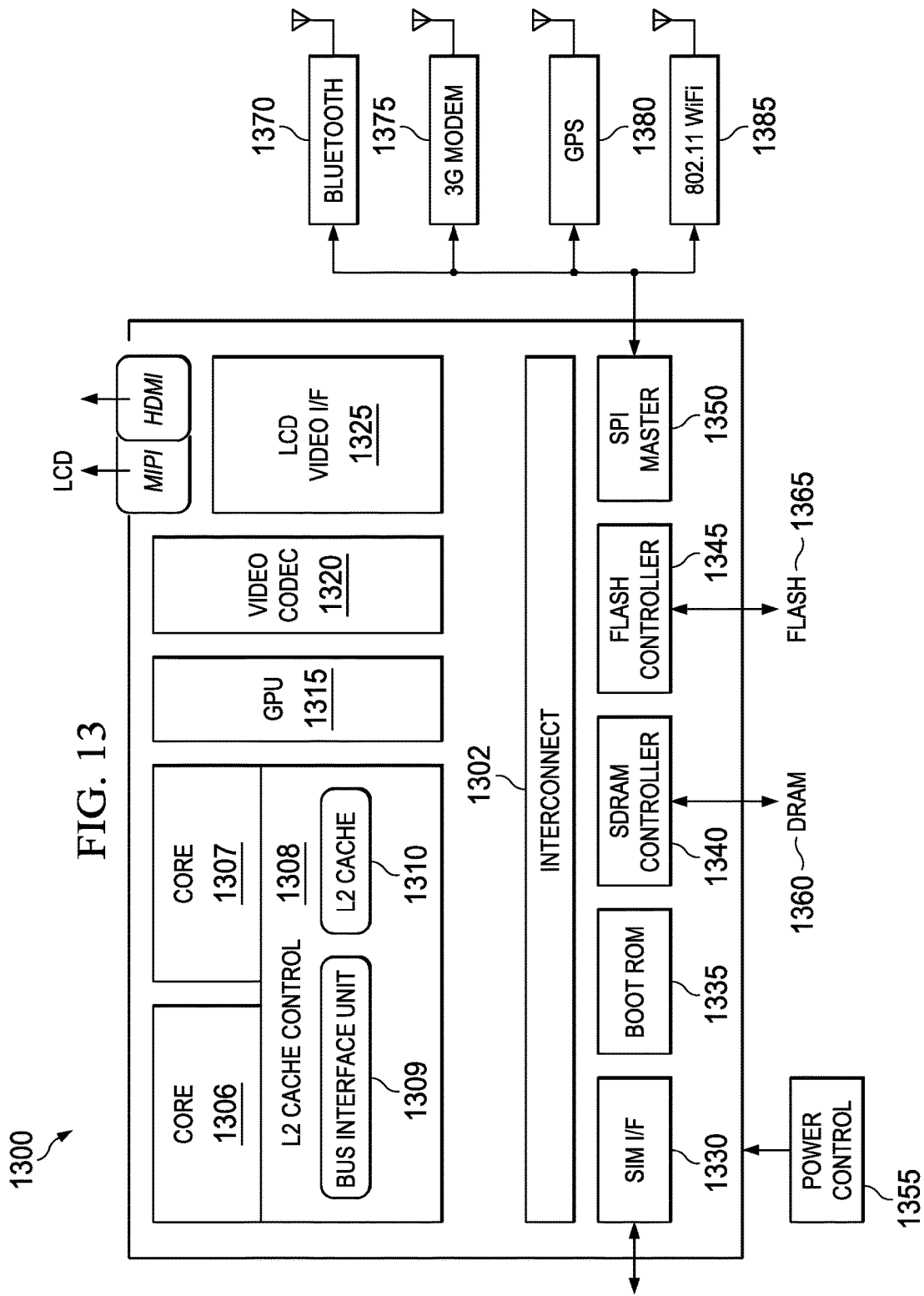
FIG. 13 is a simplified block diagram associated with an example ARM ecosystem system on chip (SOC) of the present disclosure.

Turning to FIG. 13, FIG. 13 is a simplified block diagram associated with an example ARM ecosystem SOC 1300 of the present disclosure. At least one example implementation of the present disclosure can include the mitigation of malware features discussed herein and an ARM component. For example, the example of FIG. 13 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 13, ARM ecosystem SOC 1300 may include multiple cores 1306-1307, an L2 cache control 1308, a bus interface unit 1309, an L2 cache 1310, a graphics processing unit (GPU) 1315, an interconnect 1302, a video codec 1320, and a liquid crystal display (LCD) I/F 1325, which may be associated with mobile industry processor interface (MIPI)/high-definition multimedia interface (HDMI) links that couple to an LCD.

ARM ecosystem SOC 1300 may also include a subscriber identity module (SIM) I/F 1330, a boot read-only memory (ROM) 1335, a synchronous dynamic random access memory (SDRAM) controller 1340, a flash controller 1345, a serial peripheral interface (SPI) master 1350, a suitable power control 1355, a dynamic RAM (DRAM) 1360, and flash 1365. In addition, one or more example embodiment include one or more communication capabilities, interfaces, and features such as instances of Bluetooth™ 1370, a 3G modem 1375, a global positioning system (GPS) 1380, and an 802.11 Wi-Fi 1385.

In operation, the example of FIG. 13 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 14:
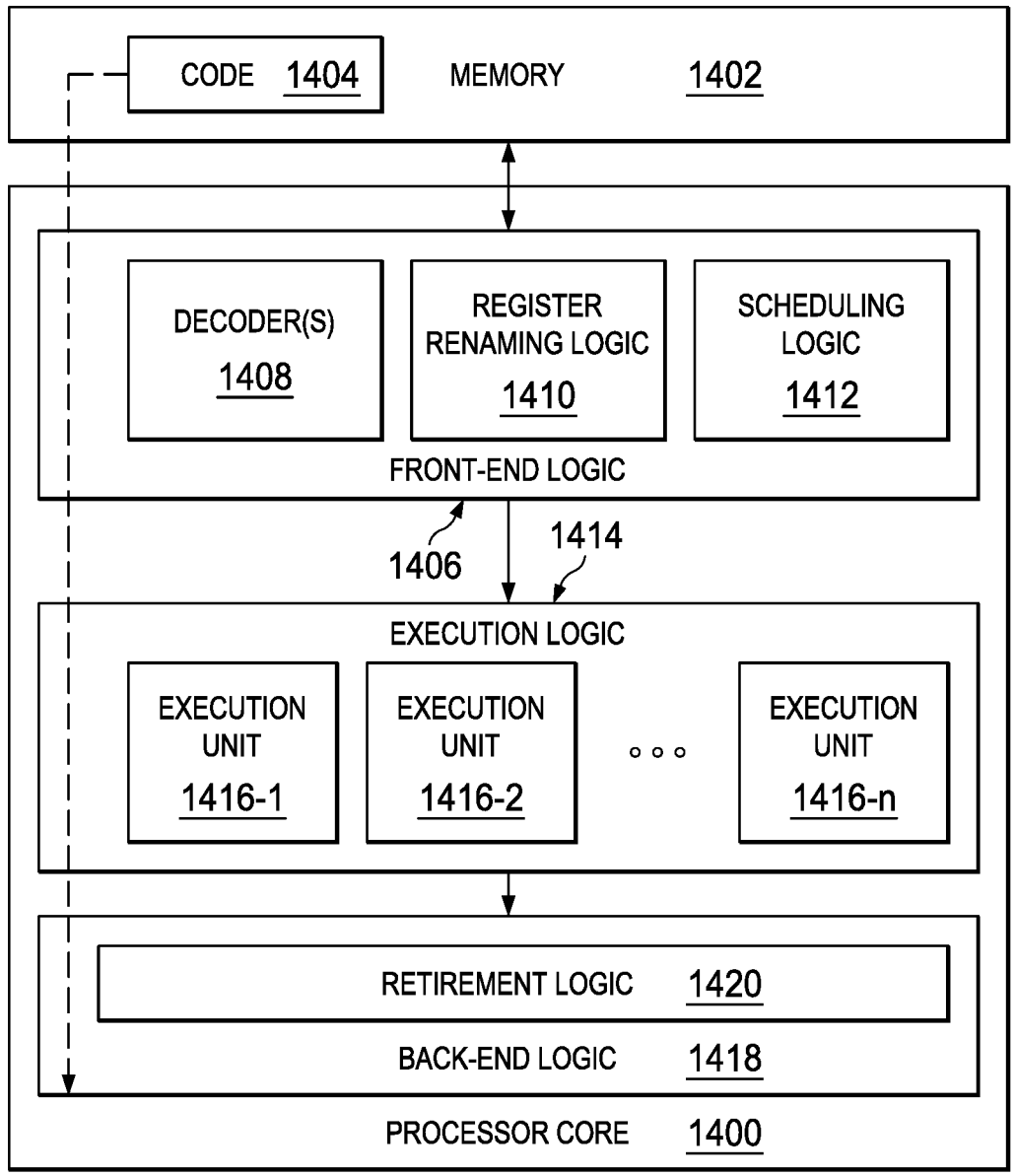
FIG. 14 is a block diagram illustrating an example processor core in accordance with an embodiment.

FIG. 14 illustrates a processor core 1400 according to an embodiment. Processor core 1400 may be the core for any type of processor, such as a micro-processor, an embedded processor, a digital signal processor (DSP), a network processor, or other device to execute code. Although only one processor core 1400 is illustrated in FIG. 14, a processor may alternatively include more than one of the processor core 1400 illustrated in FIG. 14. For example, processor core 1400 represents one example embodiment of processors cores 1274*a*, 1274*b*, 1284*a*, and 1284*b* shown and described with reference to processors 1270 and 1280 of FIG. 12. Processor core 1400 may be a single-threaded core or, for at least one embodiment, processor core 1400 may be multi-threaded in that it may include more than one hardware thread context (or "logical processor") per core.

FIG. 14 also illustrates a memory 1402 coupled to processor core 1400 in accordance with an embodiment. Memory 1402 may be any of a wide variety of memories (including various layers of memory hierarchy) as are known or otherwise available to those of skill in the art. Memory 1402 may include code 1404, which may be one or more instructions, to be executed by processor core 1400. Processor core 1400 can follow a program sequence of instructions indicated by code 1404. Each instruction enters a front-end logic 1406 and is processed by one or more decoders 1408. The decoder may generate, as its output, a micro operation such as a fixed width micro operation in a predefined format, or may generate other instructions, microinstructions, or control signals that reflect the original code instruction. Front-end logic 1406 also includes register renaming logic 1410 and scheduling logic 1412, which generally allocate resources and queue the operation corresponding to the instruction for execution.

Processor core 1400 can also include execution logic 1414 having a set of execution units 1416-1 through 1416-N. Some embodiments may include a number of execution units dedicated to specific functions or sets of functions. Other embodiments may include only one execution unit or one execution unit that can perform a particular function. Execution logic 1414 performs the operations specified by code instructions.

After completion of execution of the operations specified by the code instructions, back-end logic 1418 can retire the instructions of code 1404. In one embodiment, processor core 1400 allows out of order execution but requires in order retirement of instructions. Retirement logic 1420 may take a variety of known forms (e.g., re-order buffers or the like). In this manner, processor core 1400 is transformed during execution of code 1404, at least in terms of the output generated by the decoder, hardware registers and tables utilized by register renaming logic 1410, and any registers (not shown) modified by execution logic 1414.

Although not illustrated in FIG. 14, a processor may include other elements on a chip with processor core 1400, at least some of which were shown and described herein with reference to FIG. 12. For example, as shown in FIG. 121, a processor may include memory control logic along with processor core 1400. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 7-9) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by a processor determine a series of checksums for a file, compare the series of checksums to a checksum tree, where the checksum tree includes a plurality of nodes that each include a fuzzy checksum of known malware, and assign one or more classifications to the file, where each of the one or more classifications is based on each node of the checksum tree that matches a checksum in the series of checksums.

In Example C2, the subject matter of Example C1 can optionally include where a percentage is assigned to each of the one or more classifications.

In Example C3, the subject matter of any one of Examples C1-C2 can optionally include where each node of the plurality of nodes also includes a fuzzy checksum of known benign files.

In Example C4, the subject matter of any one of Examples C1-C3 can optionally include where the instructions, when executed by the processor, further cause the processor to compare the series of checksums to a plurality of checksum trees.

In Example C5, the subject matter of any one of Examples C1-C4 can optionally include where the instructions, when executed by the processor, further cause the processor to determine one or more characteristics for the file, and determine, based on the one or more characteristics of the file, at least one checksum tree to compare to the file.

In Example C6, the subject matter of any one of Example C1-C5 can optionally include where the instructions, when executed by the processor, further cause the processor to determine if the file is malware based on the one or more classifications assigned to the file.

In Example C7, the subject matter of any one of Examples C1-C6 can optionally include where the instructions, when executed by the processor, further cause the processor to assign a percentage to each of the one or more classifications and send the file to cloud services for further analysis if each assigned percentage is below a threshold.

In Example C8, the subject matter of any one of Examples C1-C7 can optionally include where the instructions, when executed by the processor, further cause the processor to receive a new checksum tree to be used to compare with the file checksum.

In Example A1, an apparatus can include a checksum module configured to determine a series of checksums for a file and compare the series of checksums to a checksum tree, where the checksum tree includes a plurality of nodes that each include a fuzzy checksum of known malware and a classification module configured to assign one or more classifications to the file, where each of the one or more classifications is based on each node of the checksum tree that matches a checksum in the series of checksums.

In Example, A2, the subject matter of Example A1 can optionally include where a percentage is assigned to each of the one or more classifications.

In Example A3, the subject matter of any one of Examples A1-A2 can optionally include where each node of the plurality of nodes also includes a fuzzy checksum of known benign files.

In Example A4, the subject matter of any one of Examples A1-A3 can optionally include a tree module that includes a plurality of checksum trees, where the checksum module can compare the series of checksums to a plurality of checksum trees.

In Example A5, the subject matter of any one of Examples A1-A4 can optionally include where the checksum module can be further configured to determine one or more characteristics for the file and determine, based on the one or more characteristics of the file, at least one checksum tree to compare to the file.

In Example A6, the subject matter of any one of Examples A1-A5 can optionally include where the classification module is further configured to determine if the file is malware based on the one or more classifications assigned to the file.

In Example A7, the subject matter of any one of Examples A1-A6 can optionally include where the classification module is further configured to assign a percentage to each of the one or more classifications.

In Example A8, the subject matter of any one of the Examples A1-A7 can optionally include an update module to receive a new checksum tree to be used to compare with the file checksum.

Example M1 is a method including determining a series of checksums for a file, comparing the series of checksums to a checksum tree, where the checksum tree includes a plurality of nodes that each include a fuzzy checksum of known malware, and assigning one or more classifications to the file, where each of the one or more classifications is based on each node of the checksum tree that matches a checksum in the series of checksums.

In Example M2, the subject matter of Example M1 can optionally include where a percentage is assigned to each of the one or more classifications.

In Example M3, the subject matter of any one of the Examples M1-M2 can optionally include where each node of the plurality of nodes also includes a fuzzy checksum of known benign files.

In Example M4, the subject matter of any one of the Examples M1-M3 can optionally include comparing the series of checksums to a plurality of checksum trees.

In Example M5, the subject matter of any one of the Examples M1-M4 can optionally include determining one or more characteristics for the file and determining, based on the one or more characteristics of the file, at least one checksum tree to compare to the file.

In Example M6, the subject matter of any one of the Examples M1-M5 can optionally include determining if the file is malware based on the one or more classifications assigned to the file.

In Example M7, the subject matter of any one of the Examples M1-M6 can optionally include assigning a percentage to each of the one or more classifications and sending the file to cloud services for further analysis if each assigned percentage is below a threshold.

Example S1 is a system for mitigating malware, the system can include a checksum module to determine a series of checksums for a file and a classification module to compare the series of checksums to a checksum tree, where the checksum tree includes a plurality of nodes that each include a fuzzy checksum of known malware, the classification module to also assign one or more classifications to the file, where each of the one or more classifications is based on each node of the checksum tree that matches a checksum in the series of checksums, and where a percentage is assigned to each of the one or more classifications.

In example, S2, the subject matter of Example S1 can optionally include where the checksum module determines at least one checksum tree to compare to the file based on one or more characteristics of the file Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory, computer-readable medium including one or more instructions that, when executed by at least one processor, cause the at least one processor to perform a method comprising:
    determining a first checksum at a first region or area of a first file;
    comparing the first checksum to a root in a checksum tree, the root indicating a checksum at a point of a second file or a fuzzy checksum at the point of the second file;
    determining a second checksum at a second region or area of the first file offset from the first region or area of the first file, if the first checksum matches the root;
    comparing the second checksum to a descendant node of the root in the checksum tree, the descendant node indicating a checksum or fuzzy checksum, wherein the checksum or fuzzy checksum indicated by the descendant node is offset from the point of the second file;
    assigning a classification to the first file, if the second checksum matches the descendant node, wherein the classification indicates malware or a benign file; and
    assigning a percentage to the classification.

2. The medium of claim 1, the method further comprising:
    creating and sending a feature vector to classify the first file.

3. The medium of claim 1, the method further comprising:
    receiving file data related to new malware or a new benign file; and
    creating and sending the checksum tree to analyze the first file.

4. The medium of claim 1, the method further comprising:
    comparing the second checksum to a sibling to the descendant node in the checksum tree, if the second checksum does not match the descendant node, the sibling to the descendant node indicating a checksum or fuzzy checksum.

5. The medium of claim 1, wherein the second region or area is determined at an entry point of the first file, at a resources section of the first file, or a text section of the first file.

6. An apparatus, comprising:
    a memory; and
    a processor configured
        to determine a first checksum at a first region or area of a first file;
        to compare the first checksum to a root in a checksum tree, the root indicating a checksum at a point of a second file or a fuzzy checksum at the point of the second file;
        to determine a second checksum at a second region or area of the first file offset from the first region or area of the first file, if the first checksum matches the root;
        to compare the second checksum to a descendant node of the root in the checksum tree, the descendant node indicating a checksum or fuzzy checksum, wherein the checksum or fuzzy checksum indicated by the descendant node is offset from the point of the second file;
        to assign a classification to the first file, if the second checksum matches the descendant node, wherein the classification indicates malware or a benign file; and
        to assign a percentage to the classification.

7. The apparatus of claim 6, wherein the processor is configured to create and send a feature vector to classify the first file.

8. The apparatus of claim 6, wherein the processor is configured to receive file data related to new malware or a new benign file, and to create and send the checksum tree to analyze the first file.

9. The apparatus of claim 6, wherein the processor is configured to compare the second checksum to a sibling to the descendant node in the checksum tree, if the second checksum does not match the descendant node, the sibling to the descendant node indicating a checksum or fuzzy checksum.

10. The apparatus of claim 6, wherein the second region or area is determined at an entry point of the first file, at a resources section of the first file, or a text section of the first file.

11. A method, comprising:
    determining a first checksum at a first region or area of a first file;
    comparing the first checksum to a root in a checksum tree, the root indicating a checksum at a point of a second file or a fuzzy checksum at the point of the second file;
    determining a second checksum at a second region or area of the first file offset from the first region or area of the first file, if the first checksum matches the root;
    comparing the second checksum to a descendant node of the root in the checksum tree, the descendant node indicating a checksum or fuzzy checksum, wherein the checksum or fuzzy checksum indicated by the descendant node is offset from the point of the second file;
    assigning a classification to the first file, if the second checksum matches the descendant node, wherein the classification indicates malware or a benign file; and
    assigning a percentage to the classification.

12. The method of claim 11, further comprising:
    creating and sending a feature vector to classify the first file.

13. The method of claim 11, further comprising:
    receiving file data related to new malware or a new benign file; and
    creating and sending the checksum tree to analyze the first file.

14. The method of claim 11, further comprising:
    comparing the second checksum to a sibling to the descendant node in the checksum tree, if the second checksum does not match the descendant node, the sibling to the descendant node indicating a checksum or fuzzy checksum.

* * * * *